(12) United States Patent
Akuta et al.

(10) Patent No.: US 9,678,695 B2
(45) Date of Patent: Jun. 13, 2017

(54) PRINTING MANAGEMENT SYSTEM AND IMAGE FORMING APPARATUS THAT DETERMINE WHETHER TEMPLATE PAPER IS TO BE PRINTED ON THE BASIS OF TOTAL NUMBER OF PRINTED COPIES AND TOTAL NUMBER OF READ COPIES IN ASSOCIATION WITH USER IDENTIFICATION INFORMATION

(71) Applicant: KYOCERA Document Solutions Inc., Osaka (JP)

(72) Inventors: Hidehiko Akuta, Osaka (JP); Toshihide Higashimori, Osaka (JP); Sachiko Yoshimura, Osaka (JP); Yumi Nakagoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/178,077

(22) Filed: Jun. 9, 2016

(65) Prior Publication Data

US 2016/0364191 A1    Dec. 15, 2016

(30) Foreign Application Priority Data

Jun. 10, 2015   (JP) ................. 2015-117573

(51) Int. Cl.
*G06F 15/00*      (2006.01)
*G06F 1/00*       (2006.01)
(Continued)

(52) U.S. Cl.
CPC .......... *G06F 3/1238* (2013.01); *G06F 3/1222* (2013.01); *G06F 3/1259* (2013.01);
(Continued)

(58) Field of Classification Search
CPC .... G06F 3/1238; G06F 3/1222; G06F 3/1259; H04N 1/00244; H04N 1/00411;
(Continued)

(56) References Cited

U.S. PATENT DOCUMENTS 7,854,383 B2* 12/2010 Suzuki ............... G03G 15/6582
                                                 235/382
2004/0252337 A1* 12/2004 Takabayashi ...... H04N 1/00132
                                                 358/1.15

FOREIGN PATENT DOCUMENTS

JP          2010-224674 A      10/2010

* cited by examiner

*Primary Examiner* — Douglas Tran
(74) *Attorney, Agent, or Firm* — Studebaker & Brackett PC

(57) ABSTRACT

A printing management system includes an image forming apparatus and a server apparatus. The image forming apparatus includes an acceptance section, a printing section, a reading section, a first transmission section, a first reception section, and a determination section. The determination section, when the acceptance section accepts a print request or a read request, determines whether or not template paper is to be printed, on the basis of the total number of printed copies and the total number of read copies received by the first reception section. The server apparatus includes a second reception section, a storage section, a counting section, and a second transmission section. The counting section obtains the total number of printed copies on the basis of the number of printed copies and user identification information, obtains the total number of read copies on the basis of the number of read copies and the user identification information.

10 Claims, 10 Drawing Sheets

(51) Int. Cl.
*G06K 15/00* (2006.01)
*G06F 3/12* (2006.01)
*H04N 1/00* (2006.01)

(52) U.S. Cl.
CPC ..... *H04N 1/00244* (2013.01); *H04N 1/00411* (2013.01); *H04N 1/00477* (2013.01); *H04N 2201/0081* (2013.01); *H04N 2201/0094* (2013.01)

(58) Field of Classification Search
CPC ....... H04N 1/00477; H04N 2201/0081; H04N 2201/0094
USPC ............................. 358/1.14, 1.15, 1.1, 1.18
See application file for complete search history.

PRINTING MANAGEMENT SYSTEM AND IMAGE FORMING APPARATUS THAT DETERMINE WHETHER TEMPLATE PAPER IS TO BE PRINTED ON THE BASIS OF TOTAL NUMBER OF PRINTED COPIES AND TOTAL NUMBER OF READ COPIES IN ASSOCIATION WITH USER IDENTIFICATION INFORMATION

INCORPORATION BY REFERENCE

The present application claims priority under 35 U.S.C. §119 to Japanese Patent Application No. 2015-117573, filed Jun. 10, 2015. The contents of this application are incorporated herein by reference in their entirety.

BACKGROUND

The present disclosure relates to printing management systems and image forming apparatuses.

Handout management systems are known which collect and manage handouts distributed to people who attend to a meeting. Among the handout management systems is one that compares the identification information of distributed handouts with identification information read from collected handouts to check how many handouts are returned.

SUMMARY

A printing management system according to the present disclosure includes an image forming apparatus and a server apparatus. The server apparatus is communicably coupled to the image forming apparatus. The image forming apparatus includes an acceptance section, a printing section, a reading section, a first transmission section, a first reception section, and a determination section. The acceptance section accepts user identification information for identifying a user, a print request for requesting printing of template paper on which a printing image containing a predetermined template image and a user identification image indicating the user identification information is formed, and a read request for requesting reading of an image on an original document which is the template paper which has been filled in. The printing section prints the template paper upon the print request being accepted. The reading section reads the image on the original document to acquire the user identification information upon the read request being accepted. The first transmission section transmits number-of-printed-copies information indicating the number of copies printed by the printing section, in association with the user identification information, to the server apparatus, and transmit number-of-read-copies information indicating the number of copies read by the reading section, in association with the user identification information, to the server apparatus. The first reception section receives, from the server apparatus, the total number of printed copies obtained by adding up the numbers of printed copies for each user indicated by the user identification information, and the total number of read copies obtained by adding up the numbers of read copies for each user indicated by the user identification information. The determination section, when the acceptance section accepts the print request or the read request, determine whether or not the template paper is to be printed, on the basis of the total number of printed copies and the total number of read copies received by the first reception section. The server apparatus includes a second reception section, a storage section, a counting section, and a second transmission section. The second reception section receives, from the image forming apparatus, the number-of-printed-copies information, the number-of-read-copies information, and the user identification information. The storage section stores the total number of printed copies and the total number of read copies in association with the user identification information. The counting section obtains the total number of printed copies on the basis of the number of printed copies and the user identification information, obtains the total number of read copies on the basis of the number of read copies and the user identification information, and writes the total number of printed copies and the total number of read copies to the storage section. The second transmission section transmits the total number of printed copies and the total number of read copies to the image forming apparatus.

An image forming apparatus according to the present disclosure includes an acceptance section, a printing section, a reading section, a first transmission section, a first reception section, and a determination section. The acceptance section accepts user identification information for identifying a user, a print request for requesting printing of template paper on which a printing image containing a predetermined template image and a user identification image indicating the user identification information is formed, and a read request for requesting reading of an image on an original document which is the template paper which has been filled in. The printing section prints the template paper upon the print request being accepted. The reading section reads the image on the original document to acquire the user identification information upon the read request being accepted. The first transmission section transmits number-of-printed-copies information indicating the number of copies printed by the printing section, in association with the user identification information, to a server apparatus, and transmit number-of-read-copies information indicating the number of copies read by the reading section, in association with the user identification information, to the server apparatus. The first reception section receives, from the server apparatus, the total number of printed copies obtained by adding up the numbers of printed copies for each user indicated by the user identification information, and the total number of read copies obtained by adding up the numbers of read copies for each user indicated by the user identification information. The determination section, when the acceptance section accepts the print request or the read request, determine whether or not the template paper is to be printed, on the basis of the total number of printed copies and the total number of read copies received by the first reception section.

DETAILED DESCRIPTION

Embodiments of the present disclosure will now be described with reference to the accompanying drawings. Note that the same or corresponding parts are designated by the same reference signs throughout the several views, and will not be redundantly described.

Figure 1:
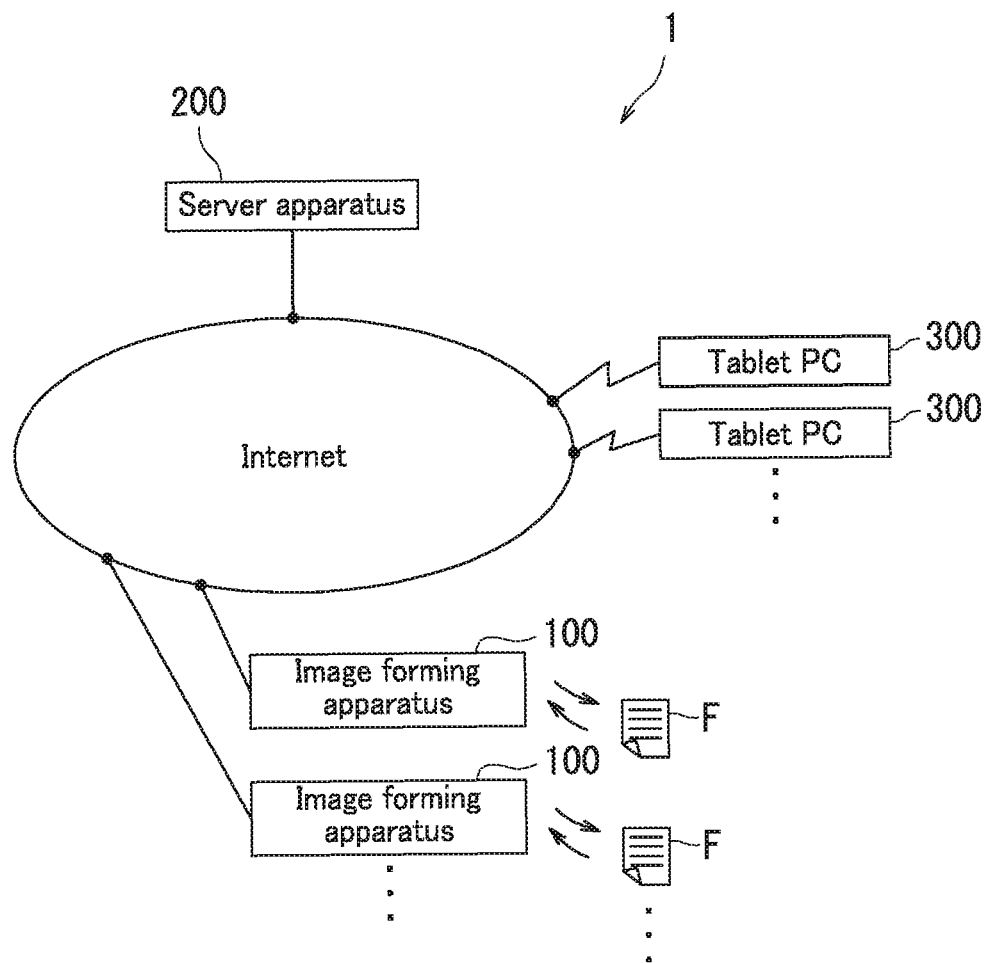
FIG. 1 is a diagram showing an overall configuration of a printing management system according to an embodiment of the present disclosure.

A printing management system 1 according to this embodiment will be described with reference to FIG. 1. FIG. 1 is a diagram showing an overall configuration of the printing management system 1. The printing management system 1 includes image forming apparatuses 100, a server apparatus 200 which can communicate with the image forming apparatuses 100, and tablet personal computers (PC) 300 (terminal apparatuses) which can communicate with the server apparatus 200.

Specifically, a plurality of image forming apparatuses 100, a single server apparatus 200, and a plurality of tablet PCs 300 are communicably coupled together through a network. For example, the apparatuses are communicably coupled together through the Internet, a local area network (LAN), or a wide area network (WAN). In this embodiment, it is assumed that the Internet is employed as an example of the network. The image forming apparatus 100 outputs template paper F or reads an image on template paper F according to the user's operation. The image forming apparatus 100 also communicates with the server apparatus 200 through the Internet. Template paper F will be described in detail below with reference to FIGS. 3A and 3B. The tablet PC 300, which is an example of a "terminal apparatus," is coupled to the Internet by wireless communication. The tablet PC 300 also communicates with the server apparatus 200 through the Internet.

Figure 2:
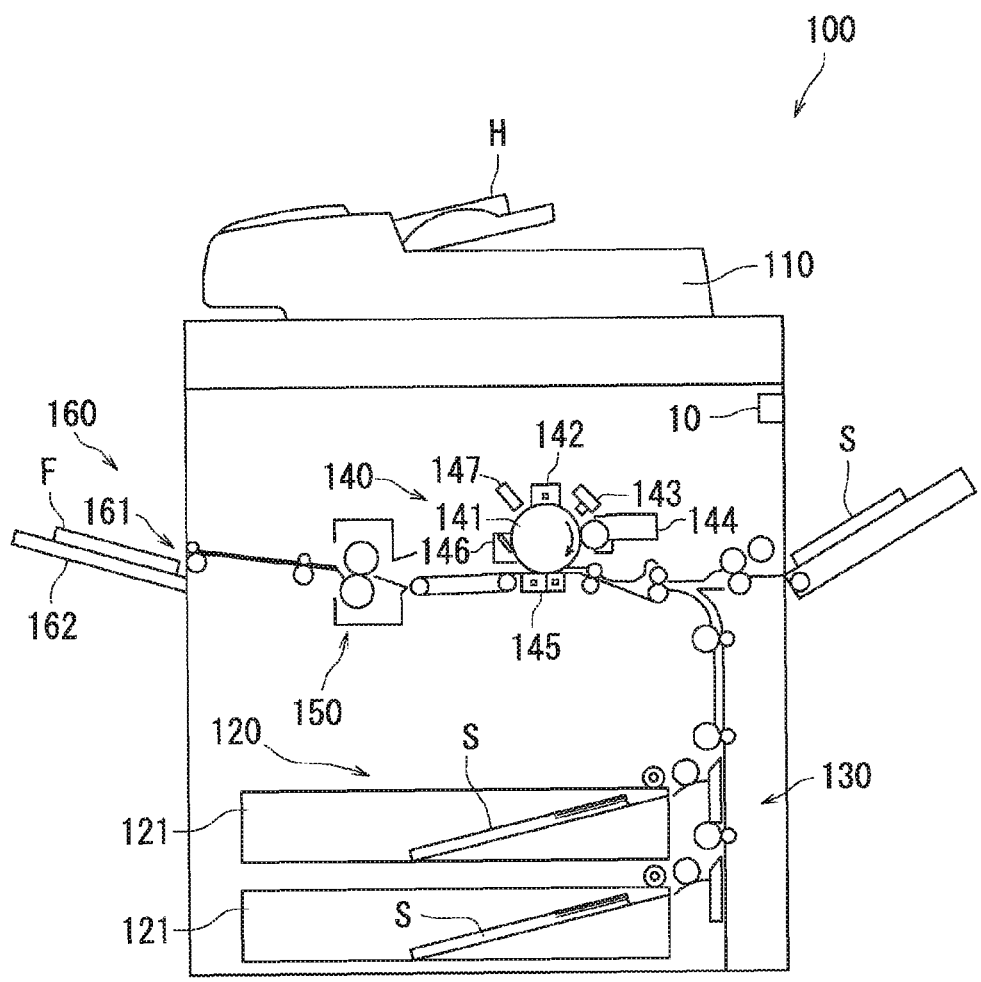
FIG. 2 is a side view showing an image forming apparatus of FIG. 1.

Next, an example of the image forming apparatus 100 will be described with reference to FIG. 2. FIG. 2 is a side view showing the image forming apparatus 100. The image forming apparatus 100 is, for example, a copier or a multi-function peripheral. The image forming apparatus 100 includes a first control section 10, an image reading section 110, a feeding section 120, a sheet conveyance section 130, an image forming section 140, a fixing section 150, and a discharging section 160.

The first control section 10 controls the image reading section 110, the feeding section 120, the sheet conveyance section 130, the image forming section 140, the fixing section 150, and the discharging section 160. A configuration of the first control section 10 will be described below with reference to FIG. 4.

The image reading section 110 reads an image on an original document H. The original document H is template paper F on which characters or graphics, etc., have been written or drawn. The image reading section 110 is, for example, a scanner having a function of conveying an original document. The feeding section 120, which includes a plurality of cassettes 121 for storing sheets S, feeds the sheets S stored in the cassettes 121, on a sheet-by-sheet basis, to the sheet conveyance section 130. The sheet S is, for example, paper.

The sheet conveyance section 130 conveys a sheet S toward the image forming section 140. The image forming section 140 forms a toner image (image) on the sheet S by an electrophotographic process. Specifically, the image forming section 140 includes a rotatably supported photosensitive drum 141. The image forming section 140 also includes, around the photosensitive drum 141, an electrification section 142, an exposure section 143, a development section 144, a transfer section 145, a cleaning section 146, and a neutralization section 147. The electrification section 142 and the exposure section 143 are used to form an electrostatic latent image on the photosensitive drum 141. The electrostatic latent image is developed by the development section 144 to form a toner image. The toner image is transferred to the sheet S by the transfer section 145. After the transfer of the toner image, the cleaning section 146 removes residual toner from the photosensitive drum 141, and the neutralization section 147 neutralizes the charge of the photosensitive drum 141.

The sheet S bearing the transferred toner image is conveyed toward the fixing section 150. The fixing section 150 applies heat and pressure to the sheet S so that the toner image transferred on the sheet S is fixed to the sheet S. Thereafter, the sheet S bearing the fixed toner image is discharged onto an exit tray 162 by a pair of discharging rollers 161 included in the discharging section 160. Thus, the toner image is fixed to the sheet 5, so that template paper F is printed, for example.

Figure 3A:
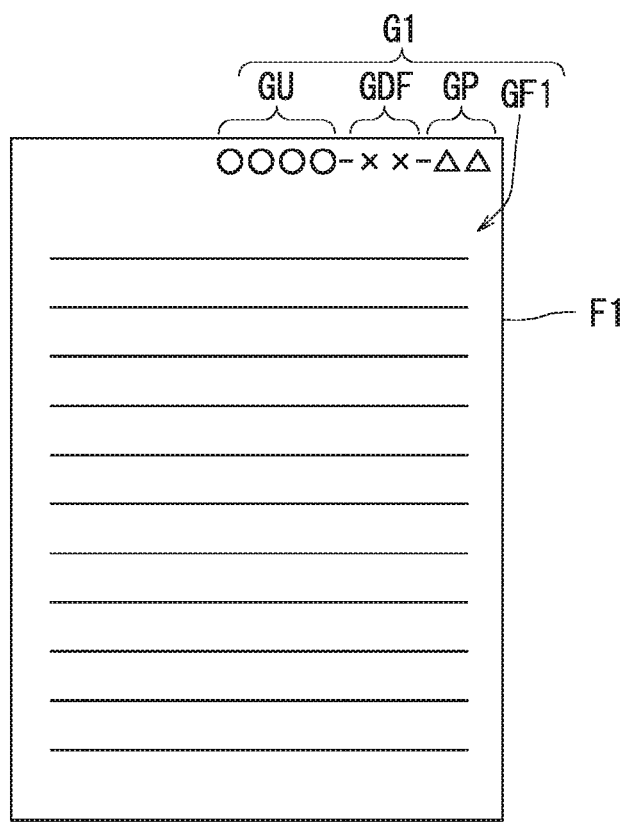
FIGS. 3A and 3B are diagrams showing examples of template paper used in the printing management system of FIG. 1.
Figure 3B:
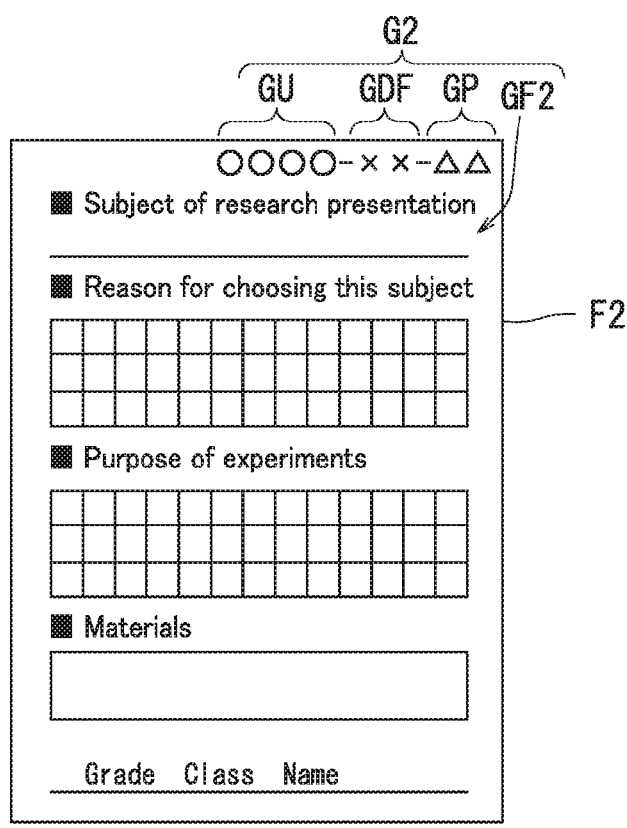

Next, template paper F will be described in detail with reference to FIGS. 3A and 3B. FIGS. 3A and 3B are diagrams showing examples of template paper F. FIG. 3A shows note paper F1 which is an example of template paper F. The note paper F1 corresponds to, for example, one page on either side of paper of a notebook used in class by a student (user) in higher grades of an elementary school.

On a surface of the note paper F1, formed is a toner image fixed by the fixing section 150 of the image forming apparatus 100, i.e., a printing image G1. The printing image G1 includes a template image GF1, a user identification image GU, a template identification image GDF, and a page identification image GP. The "note paper F1 on which only the printing image G1 is formed" is hereinafter simply referred to as the "note paper F1."

The template image GF1 is an image indicating a predetermined template. The template is set according to, for example, the subject of class (e.g., mathematics or Japanese language). The template of the note paper F1 shown in FIG. 3A is for mathematics, and has a ruling including a plurality of horizontal lines. In an embodiment in which the template is for Japanese language, the template has a ruling including a plurality of vertical lines.

The user identification image GU indicates user identification information for identifying an individual one of a plurality of users. The user identification image GU is, for example, a user ID. The user identification image GU may be a name or a QR code (registered trademark). The template identification image GDF indicates template identification information for identifying an individual one of a plurality of templates. The template identification image GDF is, for example, the name or template ID of a template. The page identification image GP indicates page identification information for identifying a page of the note paper F1. The page identification image GP is, for example, a page number.

Template paper F is not limited to the note paper F1, and may be, for example, paper for publishing or reporting research or paper for a private journal. When the user is a business person, template paper F may be, for example, paper for an operational report. Various types of template paper F can be selected according to the user and the use.

FIG. 3B shows research presentation/reporting paper F2 which is an example of template paper F. A printing image G2 is formed on a surface of the research presentation/reporting paper F2. The printing image G2 includes a template image GF2, a user identification image GU, a template identification image GDF, and a page identification image GP. A template indicated by the template image GF2 has, for example, fields for filling in, i.e., "Subject of research presentation," "Reason for choosing the subject," "Purpose of experiments," "Materials," "Class," and "Name." Note that, in this embodiment, as an example, it is assumed that the user is a student in a higher grade of an elementary school, and template paper F is the note paper F1.

Figure 4:
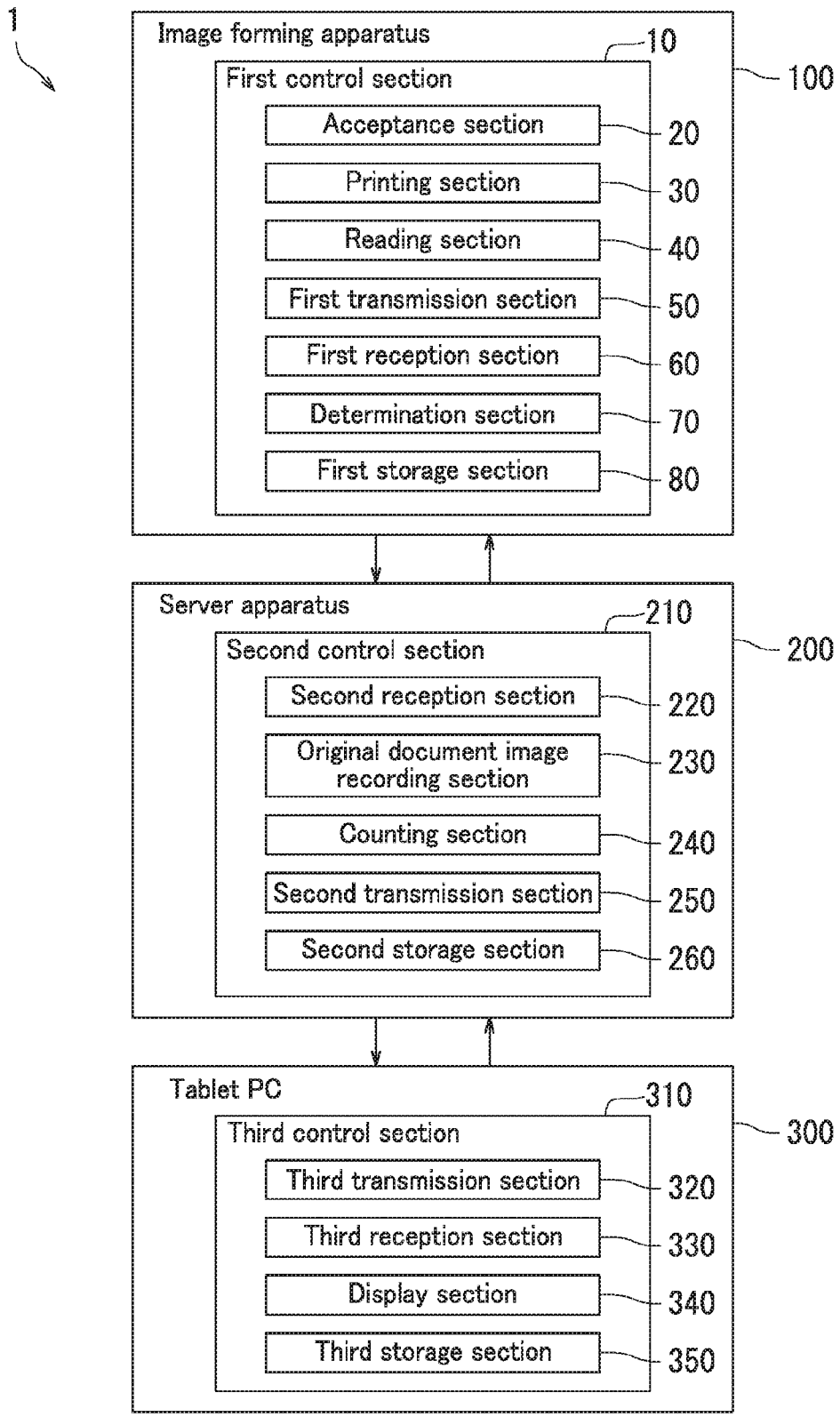
FIG. 4 is a block diagram showing a configuration of the printing management system of FIG. 1.

Next, configurations of the image forming apparatus 100, the server apparatus 200, and the tablet PC 300 will be described with reference to FIGS. 2-4. FIG. 4 is a block diagram showing a configuration of the printing management system 1.

The first control section 10 of the image forming apparatus 100 includes a central processing unit (CPU), a read only memory (ROM), a random access memory (RAM), and a hard disk drive (HDD). The first control section 10 is operated by the CPU executing a control program stored in the ROM or the HDD. The RAM is used as a work area when the CPU executes the control program. The first control section 10 includes an acceptance section 20, a printing section 30, a reading section 40, a first transmission section 50, a first reception section 60, a determination section 70, and a first storage section 80.

The acceptance section 20 accepts the user identification information, the template identification information, and a print request for printing of the note paper F1. Specifically, the acceptance section 20 controls an input section (not shown) to accept various items of information such as the user identification information, and various requests such as the print request. The input section is, for example, a touchscreen or various buttons. A student logs in to the printing management system 1 by inputting the user identification information using the touchscreen, and performs operations corresponding to various requests.

The print request is an instruction by which a student requests the image forming apparatus 100 to print the note paper F1. The print request contains an instruction to specify the number of printed copies of the note paper F1. The first transmission section 50 transmits, to the server apparatus 200, the user identification information, template identification information, and print request which have been accepted by the acceptance section 20. The acceptance section 20 notifies the determination section 70 of the acceptance of the print request.

The acceptance section 20 accepts a reference copy count NA of the note paper F1. The reference copy count NA is a threshold which is used to determine the number of output copies of the note paper F1. The reference copy count NA is associated with the user identification information and the template identification information. Specifically, the reference copy count NA is the upper limit value of the number of remaining copies ΔN of the note paper F1 currently possessed by a student, which is set for each subject and each student. The user (e.g., a teacher) previously sets the reference copy count NA by operating the touchscreen of the image forming apparatus 100. For example, a teacher sets the reference copy count NA of the note paper F1 for the subject "mathematics" to "10 copies" for each student without exception. Note that a teacher can set the average number of copies of the note paper F1 which are used by each student in one class to the reference copy count NA of the note paper F1. The first transmission section 50 transmits the input reference copy count NA to the server apparatus 200.

The acceptance section 20 also accepts a correction copy count NS of the note paper F1. The correction copy count NS is a value for correcting the number of copies of the note paper F1 which are to be output. The correction copy count NS is associated with the user identification information and the template identification information. When it is necessary to correct the number of output copies of the note paper F1, a teacher or a student previously sets the correction copy count NS by operating the touchscreen of the image forming apparatus 100. For example, when it is desirable that a margin of another three copies should be added to the number of remaining copies ΔN of the note paper F1 currently possessed by a student, a teacher previously inputs "−3" as the value of the correction copy count NS using the touchscreen. The first transmission section 50 transmits the input correction copy count NS to the server apparatus 200.

The acceptance section 20 also accepts a read request. The read request is an instruction by which a student requests the image forming apparatus 100 to read an image on the original document H. The original document H is template paper F which has been filled in. Template paper F which has been filled in is, for example, the note paper F1 on which at least one of characters and graphics have been copied from a blackboard or the like in class which a student attended.

Upon the printing section 30 accepting the print request, the printing section 30 adds the user identification image GU, the template identification image GDF, and the page identification image GP to the predetermined. template image GF1 to generate the printing image G1. The printing section 30 forms the printing image G1 on a sheet S to print the note paper F1.

Specifically, the printing section 30 controls the feeding section 120, the sheet conveyance section 130, the image forming section 140, the fixing section 150, and the discharging section 160 according to a print instruction received from the determination section 70 so that a specified number of copies of the note paper F1 having a specified template are printed. A plurality of template images including the template image GF1 are previously stored in the first storage section 80. The printing section 30 adds the user identification image GU, the template identification image GDF, and the page identification image GP shown in FIG. 3A to the template image GF1 to generate the printing image G1. A student removes the printed note paper F1 from the exit tray 162, attends predetermined class, and copies characters and graphics on a blackboard or the like to the note paper F1.

Upon the reading section 40 receiving the read request, the reading section 40 reads an image on the original document H. Specifically, the acceptance section 20 accepts the read request according to a student's operation, and notifies the reading section 40 of the read request. The reading section 40 controls the image reading section 110 in response to the read request so that the image reading section 110 reads an image on the original document H, to acquire read image information corresponding to the image on the original document H. From the user identification image GU, the template identification image GDF, and the page identification image GP contained in the image read from the original document H, the reading section 40 acquires the corresponding user identification information, template identification information, and page identification information.

When the printing section 30 has printed the note paper F1, the first transmission section 50 transmits, to the server apparatus 200, number-of-printed-copies information in associated with the user identification information and the template identification information. The number-of-printed-copies information indicates the number of copies of the note paper F1 which have been printed by the printing section 30 in response to the print request.

When the reading section 40 reads an image on the original document H, the first transmission section 50 transmits, to the server apparatus 200, the read image information and number-of-read-copies information in association with the user identification information, the template identification information, and the page identification information. The number-of-read-copies information indicates the number of sheets of the original document H from which the reading section 40 has read an image in response to the read request.

The first reception section 60 receives total-number-of-printed-copies information, total-number-of-read-copies information, reference copy count information, and correction copy count information from the server apparatus 200, and notifies the determination section 70 of these items of information. The total number of printed copies NP is obtained by adding up the numbers of printed copies of the note paper F1 for each user indicated by the user identification information and each template indicated by the template identification information. The total number of read copies NR is obtained by adding up the numbers of read copies of the original document H for each user indicated by the user identification information and each template indicated by the template identification information.

When the acceptance section 20 accepts the print request, the determination section 70 determines whether or not the note paper F1 is to be printed, on the basis of the total number of printed copies NP and the total number of read copies NR received by the first reception section 60. If the determination result indicates that the number of remaining copies ΔN obtained by subtracting the total number of read copies NR from the total number of printed copies NP is greater than or equal to the reference copy count NA, the determination section 70 determines that the note paper F1 is not to be printed.

Specifically, the determination section 70 performs the determination on the basis of the print request received from the acceptance section 20, and the total number of printed copies NP, the total number of read copies NR, the reference copy count NA, and the correction copy count NS received from the first reception section 60. The determination section 70 determines whether or not printing is to be performed, using the following expression:

$$\text{the total number of printed copies NP} - \text{the total number of read copies NR} + \text{the correction copy count NS} \geq \text{the reference copy count NA} \quad (1)$$

When Expression (1) is satisfied, the determination section 70 determines that the note paper F1 is not to be printed. The determination section 70 also, when determining that the note paper F1 is not to be printed, displays a message on a display section (not shown), and prohibits printing. The display section is, for example, a display. Specifically, the determination section 70 displays, on the touchscreen of the image forming apparatus 100, a message indicating that the number of remaining copies ΔN of the note paper F1 currently possessed is great enough for the number of copies of the note paper F1 required for the next class. The number of remaining copies ΔN which is obtained by subtracting the total number of read copies NR from the total number of printed copies NP and adding the correction copy count NS to the resulting value may be hereinafter referred to as the "corrected number of remaining copies ΔNC." A teacher can finely adjust the number of copies of the note paper F1 for a specific subject possessed by a specific student as appropriate by setting the correction copy count NS.

Meanwhile, when Expression (1) is not satisfied, the determination section 70 determines that the note paper F1 is to be printed. When Expression (1) is not satisfied, the number of remaining copies ΔN of the note paper F1 currently possessed is not great enough for the number of copies of the note paper F1 required for the next class. The determination section 70, when determining that the note paper F1 is to be printed, issues a print instruction to the printing section 30.

When the acceptance section 20 accepts the read request, the determination section 70 also determines whether or not the note paper F1 is to be printed, on the basis of the total number of printed copies NP and the total number of read copies NR received by the first reception section 60, which is similar to that described above. Specifically, after the reading section 40 has acquired the read image information, the determination section 70 performs the determination on the basis of the total number of printed copies NP, the total number of read copies NR, the reference copy count NA, and the correction copy count NS received from the first reception section 60. The determination section 70 determines whether or not printing is to be performed, using Expression (1). The determination section 70, when determining that the note paper F1 is to be printed, displays a message indicating that the number of remaining copies ΔN of the note paper F1 currently possessed is not great enough, on a display section (not shown).

The first storage section 80 previously stores template image data corresponding to a plurality of template images.

Next, a configuration of the server apparatus 200 will be described with reference to FIG. 4. A second control section 210 of the server apparatus 200 includes a CPU, a ROM, a RAM, and a HUD. The second control section 210 is operated by the CPU executing a control program stored in the ROM or the HDD. The RAM is used as a work area when the CPU executes the control program. The second control section 210 includes a second reception section 220, an original document image recording section 230, a counting section 240, a second transmission section 250, and a storage section (hereinafter referred to as a "second storage section") 260.

The second reception section 220 receives the user identification information, the template identification information, and the print request. Specifically, when a student issues the print request for the note paper F1, the second reception section 220 receives print instruction information containing the user identification information, the template identification information, and the print request information, from the first transmission section 50 of the image forming apparatus 100. The second reception section 220 notifies the counting section 240 of the received print instruction information.

The second reception section 220 also receives the number-of-printed-copies information, the user identification information, and the template identification information. Specifically, when the image forming apparatus 100 prints the note paper F1 in response to a print request, the second reception section 220 receives the number-of-printed-copies information, the user identification information, and the template identification information transmitted from the first transmission section 50 of the image forming apparatus 100, and notifies the counting section 240 of these items of information.

The second reception section 220 also receives the number-of-read-copies information and the user identification information. Specifically, when the image forming apparatus 100 reads an image on the note paper F1 in response to the read request, the second reception section 220 notifies the counting section 240 of the read image information, the number-of-read-copies information, the user identification information, the template identification information, and the page identification information received from the first transmission section 50.

The second reception section 220 also receives the read image information, the user identification information, and the template identification information from the image forming apparatus 100. Specifically, the second reception section 220 receives the read image information, the user identification information, and the template identification information transmitted from the first transmission section 50, and notifies the original document image recording section 230 of these items of information.

The second reception section 220 also receives the user identification information, the template identification information, and image request information from the tablet PC 300. The image request information is an instruction which requests transmission of the read image information corresponding to the user identification information and the template identification information.

The original document image recording section 230 writes the read image information in association with the user identification information, the template identification information, and the page identification information to the second storage section 260. Specifically, on the basis of the read image information, the user identification information, the template identification information, and the page identification information received from the second reception section 220, the original document image recording section 230 searches and determines whether or not the corresponding read image information is already stored in the second storage section 260. When the corresponding read image information is not stored in the second storage section 260, the original document image recording section 230 newly writes the read image information in association with the user identification information and the template identification information to the second storage section 260, and notifies the counting section 240 of the result of the writing. When the corresponding read image information is already stored in the second storage section 260, the counting section 240 overwrites the corresponding read image information with the read image information.

The counting section 240 calculates the total number of printed copies NP on the basis of the number-of-printed-copies information, the user identification information, and the template identification information, and writes the total number of printed copies NP to the second storage section 260. Specifically, the counting section 240 calculates the total number of printed. copies NP of the note paper F1 for each student and each subject, on the basis of the number-of-printed-copies information, the user identification information, and the template identification information received from the second reception section 220, and writes the total number of printed copies NP to the second storage section 260.

The counting section 240 also calculates the total number of read copies NR on the basis of the number-of-read-copies information, the user identification information, and the template identification information, and writes the total number of read copies NR to the second storage section 260. Specifically, the counting section 240 receives, from the original document image recording section 230, a notification indicating the result of newly writing the read image information to the second storage section 260. The counting section 240 also calculates the total number of read copies NR of the note paper F1 for each student and each subject, on the basis of the read image information, the number-of-read-copies information, the user identification information, the template identification information, and the page identification information received from the second reception section 220. The counting section 240 writes the calculated total number of read copies NR to the second storage section 260.

The counting section 240 also calculates the number of reading times NE the reading section 40 has read an image on the original document H for each user indicated by the user identification information and each template indicated by the template identification information, on the basis of the number-of-read-copies information, the user identification information, and the template identification information. The counting section 240 writes the number of reading times NE in association with the user identification information and the template identification information to the second storage section 260. The counting section 240 calculates the average number of read copies NV by dividing the total number of read copies NR by the number of reading times NE for each user indicated by the user identification information and each template indicated by the template identification information. The counting section 240 writes the average number of read copies NV to the second storage section 260 for each user indicated by the user identification information and each template indicated by the template identification information. When a teacher sets the average number of read copies NV to the reference copy count NA using an input section of the image terming apparatus 100, the counting section 240 writes the average number of read copies NV as the reference copy count NA to the second storage section 260.

The counting section 240 also reads the read image information corresponding to the user identification information and the template identification information, from the second storage section 260, according to the image request information transmitted from the tablet PC 300.

The second transmission section 250 transmits the total number of printed copies NP and the total number of read copies NR calculated by the counting section 240 to the image forming apparatus 100. The second transmission section 250 also transmits information indicating the reference copy count NA to the image forming apparatus 100 in response to the print request or the read request.

The second transmission section 250 also transmits the read image information read out by the counting section 240 to the tablet PC 300, according to the image request information transmitted from the tablet PC 300.

The second storage section 260 stores the read image information in association with the user identification information, the template identification information, and the page identification information. The second storage section 260 also stores the total number of printed copies NP, the total number of read copies NR, the correction copy count NS, the average number of read copies NV, and the number of reading times NE in association with the user identification information and the template identification information. The second storage section 260 also stores the reference copy count NA in association with at least one of the user identification information and the template identification information.

Next, a configuration of the terminal apparatus according to this embodiment will be described. with reference to FIG. 4. The terminal apparatus is, for example, a tablet PC, a personal computer, or a smartphone. In this embodiment, it is assumed that the terminal apparatus is the tablet PC 300. A student and a teacher each have their own tablet PC 300. A third control section 310 of the tablet PC 300 includes a CPU, a ROM, and a RAM. The tablet PC 300 is operated by the CPU executing a control program stored in the ROM. The RAM is used as a work area when the CPU executes the control program. The third control section 310 includes a third transmission section 320, a third reception section 330, a display section 340, and a third storage section 350.

The third transmission section 320 transmits, to the server apparatus 200, the user identification information, the template identification information, and the image request information input by the user. The image request information indicates a request for the read image information corresponding to the user identification information and the template identification information. For example, a student requests the read image information corresponding to the original document H for his or her own mathematics subject from the server apparatus 200 through the tablet PC 300. In addition, a teacher can request the read image information from the server apparatus 200 through the tablet PC 300.

The third reception section 330 receives the read image information transmitted from the server apparatus 200 according to the image request information. The third reception section 330 stores the read image information to the third storage section 350.

The display section 340 displays a read image corresponding to the received read image information. The display section 340 is, for example, a touchscreen. The touchscreen also functions as an input section (not shown). A student or a teacher inputs an instruction to request the read image information, by operating the touchscreen.

The third storage section 350 stores the read image information received from the server apparatus 200.

Figure 5:
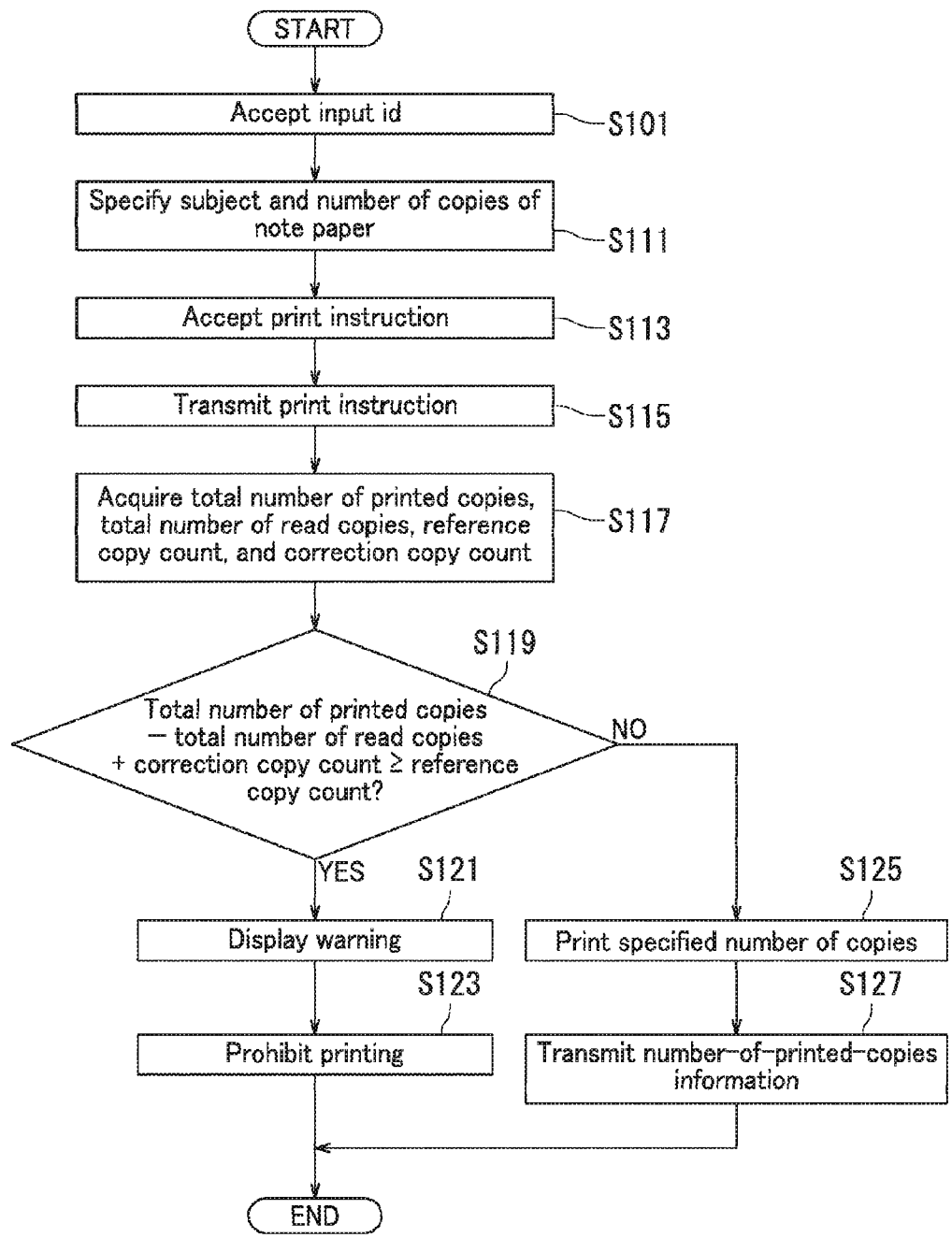
FIG. 5 is a flowchart showing a printing management process of the image forming apparatus of FIG. 1.

Next, a printing management process will be described with reference to FIGS. 4 and 5. The printing management process described here is performed by the image forming apparatus 100 when a student requests printing of the note paper F1. FIG. 5 is a flowchart showing the printing management process of the image forming apparatus 100 of FIG. 1.

In step S101, the acceptance section 20 accepts an input user ID. Specifically, a student logs in to the printing management system 1 by inputting the user identification information (e.g., a user ID) using the touchscreen of the image forming apparatus 100. Control proceeds to step S111.

Next, in step S111, the student specifies the subject and the number of copies of the note paper F1. Specifically, the student chooses a template corresponding to the desired subject (e.g., mathematics) from a list of formants for the note paper F1 displayed on the touchscreen of the image forming apparatus 100. The student also specifies the number of copies of the note paper F1 which are to be output, using the touchscreen. Control proceeds to step S113.

Next, in step S113, the acceptance section 20 accepts an instruction to print the note paper F1. Specifically, the student inputs the instruction to print the note paper F1 by touching a "start print" button on the touchscreen. The acceptance section 20 accepts the print instruction, the template identification information indicating a specified template, and a specified printed copy count, in association with the user identification information. Control proceeds to step S115.

Next, in step S115, the first transmission section 50 transmits a print instruction. Specifically, the first transmission section 50 transmits the print instruction accepted by the acceptance section 20 to the server apparatus 200. Control proceeds to step S117.

Next, in step S117, the first reception section 60 acquires the total number of printed copies NP, the total number of read copies NR, the reference copy count NA, and the correction copy count NS. Specifically, the first reception section 60 receives the total number of printed copies NP, the total number of read copies NR, the reference copy count NA, and the correction copy count NS transmitted. from the server apparatus 200, and notifies the determination section 70 of these items of information. Control proceeds to step S119.

Next, in step S119, when Expression (1) is satisfied (YES in step S119), control proceeds to step S121. Specifically, when Expression (1) is satisfied, the number of remaining copies $\Delta N$ of the note paper F1 currently possessed is great enough for the number of copies of the note paper F1 required for the next class, and therefore, the determination section 70 determines that the note paper F1 is not to be printed. Thereafter, control proceeds to step S121. Meanwhile, when Expression (1) is not satisfied (NO in step S119), control proceeds to step S125. Specifically, when Expression (1) is not satisfied, the number of remaining copies $\Delta N$ of the note paper F1 currently possessed is not great enough for the number of copies of the note paper F1 required for the next class, and therefore, the determination section 70 determines that the note paper F1 is to be printed. Thereafter, control proceeds to step S125.

When the condition for the above branch at step S119 is satisfied ("YES"), control proceeds to step S121. In step S121, the determination section 70 displays, on the touchscreen of the image forming apparatus 100, a message (warning) indicating that the number of remaining copies $\Delta N$ of the note paper F1 currently possessed is great enough for the number of copies of the note paper F1 required for the next class. Control proceeds to step S123.

Next, in step S123, the determination section 70 prohibits printing. Specifically, the determination section 70 displays, on the touchscreen, a message indicating that printing is prohibited. Thereafter, the process ends.

When the condition for the above branch at step S119 is not satisfied ("NO"), control proceeds to step S125. In step S125, the printing section 30 prints a specified number of copies of the note paper F1. Specifically, the determination section 70 issues the print instruction to the printing section 30. The printing section 30 outputs the note paper F1 which corresponds to the template identification information and the user identification information contained in the print instruction, and the number of copies of which is also specified in the print instruction. Control proceeds to step S127.

Next, in step S127, the first transmission section 50 transmits the number-of-printed-copies information about the note paper F1 in association with the user identification information and the template identification information to the server apparatus 200. Thereafter, the process ends.

Next, a printing management process will be described with reference to FIGS. 4 and 6. The printing management process described here is performed by the server apparatus 200 when a student requests printing of the note paper F1.

Figure 6:
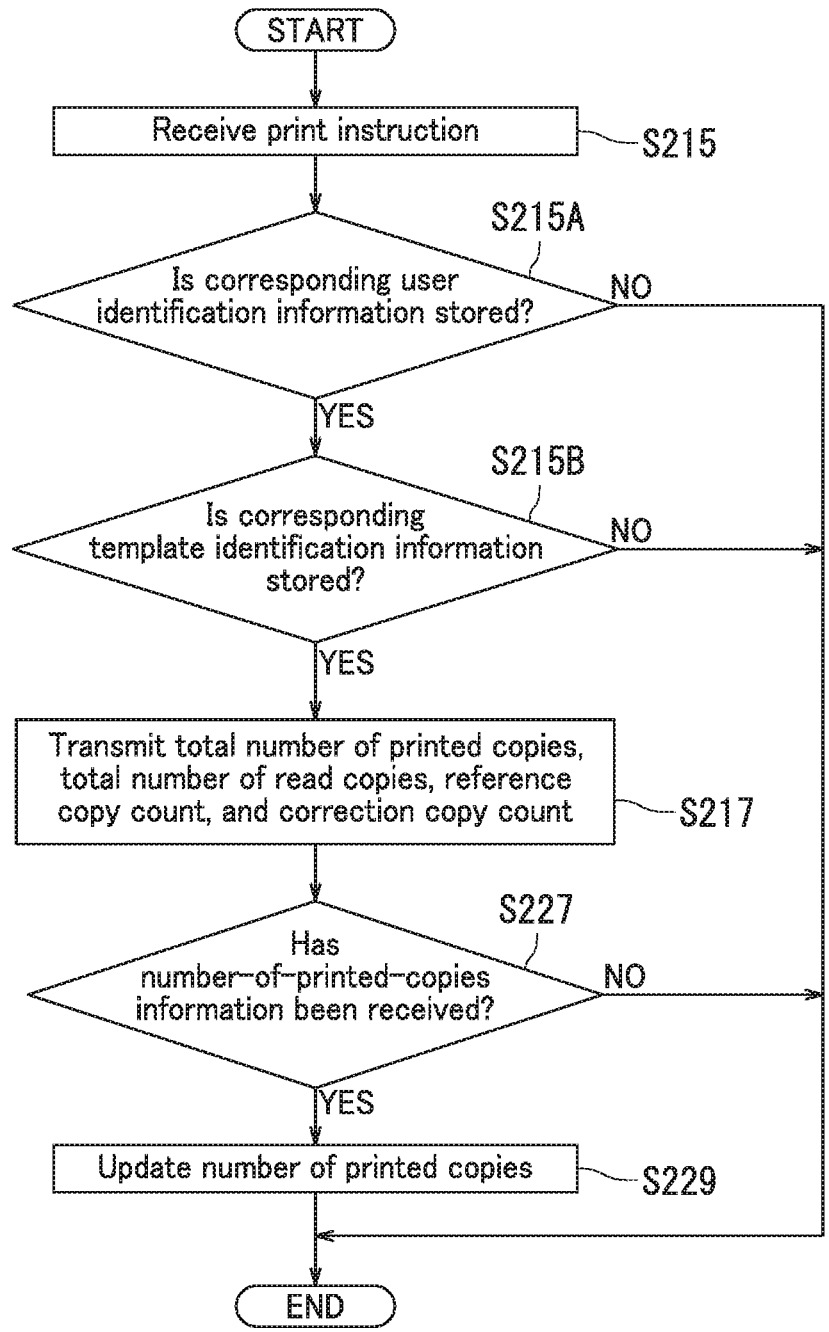
FIG. 6 is a flowchart showing a printing management process of a server apparatus of FIG. 1.

FIG. 6 is a flowchart showing the printing management process of the server apparatus 200 of FIG. 1.

In step S215, the second reception section 220 receives the print instruction transmitted from the image forming apparatus 100. The second reception section 220 notifies the counting section 240 of the received print instruction. Control proceeds to step S215A. Step S215 partially corresponds to step S115 of the printing management process of the image forming apparatus 100 which has been described above with reference to FIG. 5.

Next, in step S215A, the counting section 240 checks the user identification information contained in the received print instruction against the user identification information stored in the second storage section 260. When the checking result indicates that the user identification information contained in the print instruction is stored in the second storage section 260 (YES in step S215A), control proceeds to step S215B. Meanwhile, when the corresponding user identification information is not stored in the second storage section 260 (NO in step S215A), the process ends.

Next, in step S215B, the counting section 240 checks the template identification information contained in the received print instruction against the template identification information stored in the second storage section 260. When the checking result indicates that the template identification information contained in the print instruction is stored in the second storage section 260 (YES in step S215B), control proceeds to step S217. Meanwhile, when the corresponding template identification information is not stored in the second storage section 260 (NO in step S215B), the process ends.

Next, in step S217, the second transmission section 250 transmits the total number of printed copies NP, the total number of read copies NR, the reference copy count NA, and the correction copy count NS to the image forming apparatus 100. Specifically, the counting section 240 reads, from the second storage section 260, the total number of printed copies NP, the total number of read copies NR, the reference copy count NA, and the correction copy count NS which are associated with both the user identification information and the template identification information. The second transmission section 250 transmits, to the image forming apparatus 100, the total number of printed copies NP, the total number of read copies NR, the reference copy count NA, and the correction copy count NS thus read out, in association with the user identification information and the template identification information. Control proceeds to step S227. Step S217 partially corresponds to step S117 of the printing management process of the image forming apparatus 100 which has been described above with reference to FIG. 5.

Next, in step S227, the second reception section 220 determines whether or not the second reception section 220 has received the number-of-printed-copies information. When the second reception section 220 has received the number-of-printed-copies information (YES in step S227), control proceeds to step S229. Specifically, the second reception section 220 receives the number-of-printed-copies information associated with the user identification information and the template identification information from the image forming apparatus 100. The second reception section 220 notifies the counting section 240 of the received number-of-printed-copies information. Meanwhile, when the second reception section 220 has not received the number-of-printed-copies information (NO in step S227), the printing management process ends. Step S227 corresponds to step S127 of the printing management process of the image forming apparatus 100 which has been described above with reference to FIG. 5.

Next, in step S229, the counting section 240 updates the number of printed copies. Specifically, the counting section 240 adds the number of printed copies indicated by the number-of-printed-copies information received from the second reception section 220, to the total number of printed copies NP detected in step S217. The counting section 240 overwrites the total number of printed copies NP stored in the second storage section 260 with the resultant total number of printed copies NP. Thereafter, the process ends.

Figure 7:
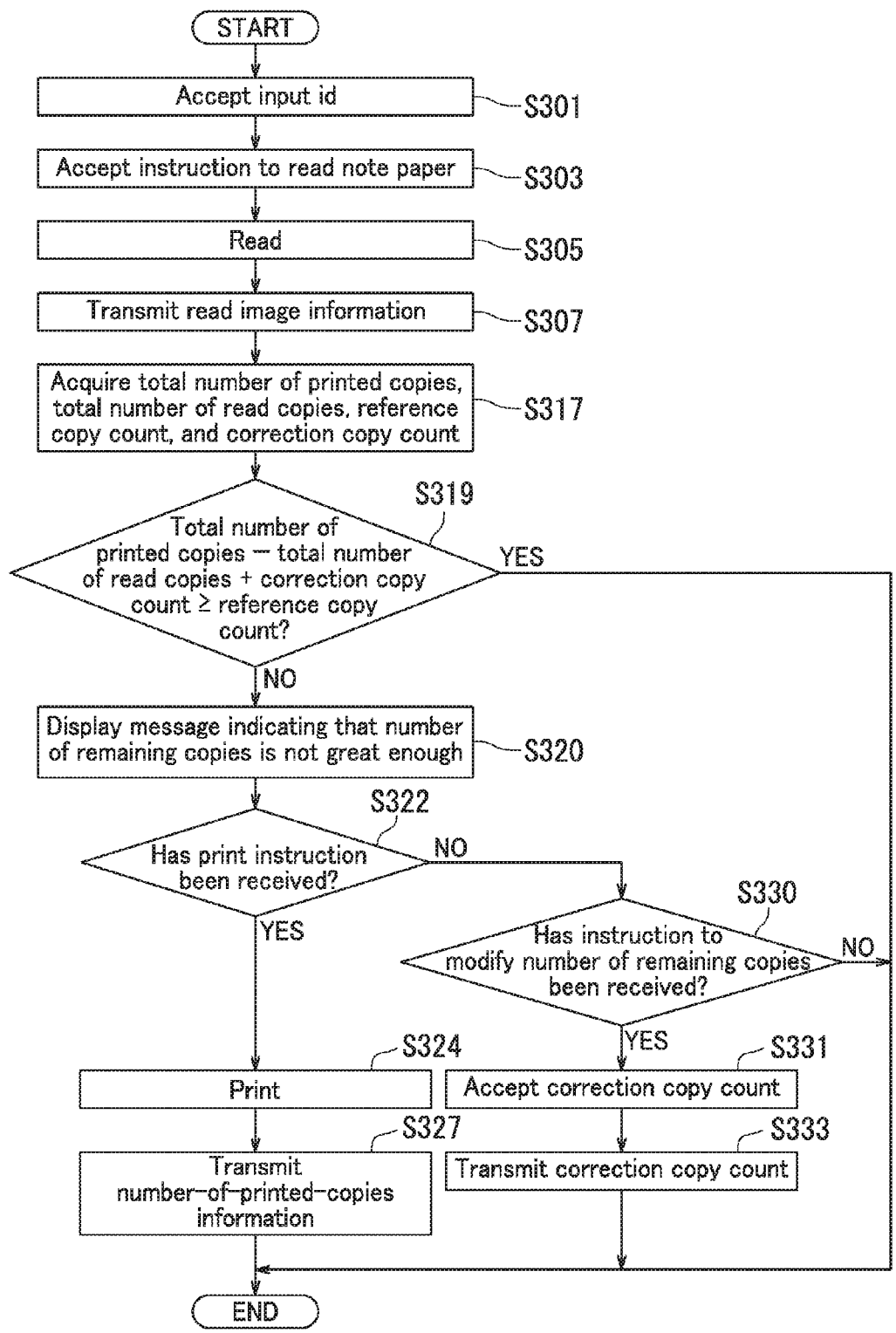
FIG. 7 is a flowchart showing a printing management process of the image forming apparatus of FIG. 1.

Next, a printing management process will be described with reference to FIGS. 4 and 7. The printing management process described here is performed by the image forming apparatus 100 when a student requests reading of the original document H. FIG. 7 is a flowchart showing the printing management process of the image limiting apparatus 100.

In step S301, a process similar to that of step S101 which has been described above with reference to FIG. 5 is performed. Control proceeds to step S303.

Next, in step S303, the acceptance section 20 accepts an instruction to read the original document H. Specifically, a student sets the original document H on the image reading section 110 of the image forming apparatus 100. When the student touches a "start read" button on the touchscreen, an instruction to read an image on the original document H is issued. The acceptance section 20 receives the read instruction, and notifies the reading section 40 of the read request. Control proceeds to step S305.

Next, in step S305, the reading section 40 reads an image on the original document H. Specifically, the reading section 40 controls the image reading section 110 according to the read request, and thereby acquires the read image information about the original document H. The reading section 40 acquires the user identification information, the template identification information, and the page identification information from the read image information. Control proceeds to step S307.

Next, in step S307, the first transmission section 50 transmits the read image information to the server apparatus 200. Specifically, the first transmission section 50 transmits, to the server apparatus 200, the read image information and the number-of-read-copies information in association with the user identification information, the template identification information, and the page identification information. Control proceeds to step S317.

Next, in step S317, a process similar to that of step S117 which has been described above with reference to FIG. 5 is performed. Control proceeds to step S319.

Next, in step S319, performed is a process similar to that of step S119 of the printing management process of the image forming apparatus 100 which has been described above with reference to FIG. 5. Note that when Expression (1) is not satisfied in step S319 (NO in step S319), control proceeds to step S320. Meanwhile, when Expression (1) is satisfied in step S319 (YES in step S319), the process ends.

Next, in step S320, the determination section 70 displays, on the touchscreen of the image forming apparatus 100, a message indicating that the number of remaining copies ΔN is not great enough. Specifically, the number of remaining copies ΔN of the note paper F1 currently possessed is riot great enough for the reference copy count NA of the note paper F1 required for the next class of the same subject, and therefore, the determination section 70 displays, on the touchscreen, a message indicating that one or more copies corresponding to the shortfall can be printed. Control proceeds to step S322.

Next, in step S322, a student issues an instruction to print the note paper F1 by touching the "start print" button on the touchscreen. The acceptance section 20 accepts the print instruction. When the acceptance section 20 thus accepts the instruction to print the note paper F1 (YES in step S322), control proceeds to step S324. Meanwhile, when the acceptance section 20 does not accept the instruction to print the note paper F1 (NO in step S322), control proceeds to step S330.

Next, in step S324, the printing section 30 prints the note paper F1. Specifically, the acceptance section 20 issues a print instruction to the printing section 30 through the determination section 70. The printing section 30 outputs one or more copies of the note paper F1 corresponding to a shortfall with respect to the reference copy count NA, according to the template identification information and the user identification information. Control proceeds to step S327.

Next, step S327 corresponds to step S127 which has been described above with reference to FIG. 5, in which a similar process is performed. Thereafter, the process ends.

When the condition for the above branch at step S322 is "NO," control proceeds to step S330. In step S330, the determination section 70 displays, on the touchscreen, a message indicating that an instruction to modify the number of remaining copies ΔN of the note paper F1 can be accepted. A student inputs the actual number of remaining copies ΔNB of the note paper F1 currently possessed into the touchscreen, and issues an instruction to modify the number of remaining copies ΔN. The acceptance section 20 accepts the input actual number of remaining copies ΔNB and the input modify instruction, and notifies the determination section 70 of the actual number of remaining copies ΔNB. When the acceptance section 20 has thus accepted an instruction to modify the number of remaining copies ΔN of the note paper F1 (YES in step S330), control then proceeds to step S331. Meanwhile, when the acceptance section 20 has not accepted an instruction to modify the number of remaining copies ΔN of the note paper F1 (NO in step S330), then the process ends.

Next, in step S331, on the basis of the received actual number of remaining copies ΔNB, the determination section 70 calculates the value of "the total number of printed copies NP—the total number of read copies NR—the actual number of remaining copies ΔNB." The determination section 70 accepts the calculated value as the correction copy count NS. Control proceeds to step S333.

Next, in step S333, the first transmission section 50 transmits the accepted correction copy count NS in association with the user identification information and the template identification information to the server apparatus 200. Thereafter, the process ends.

Figure 8:
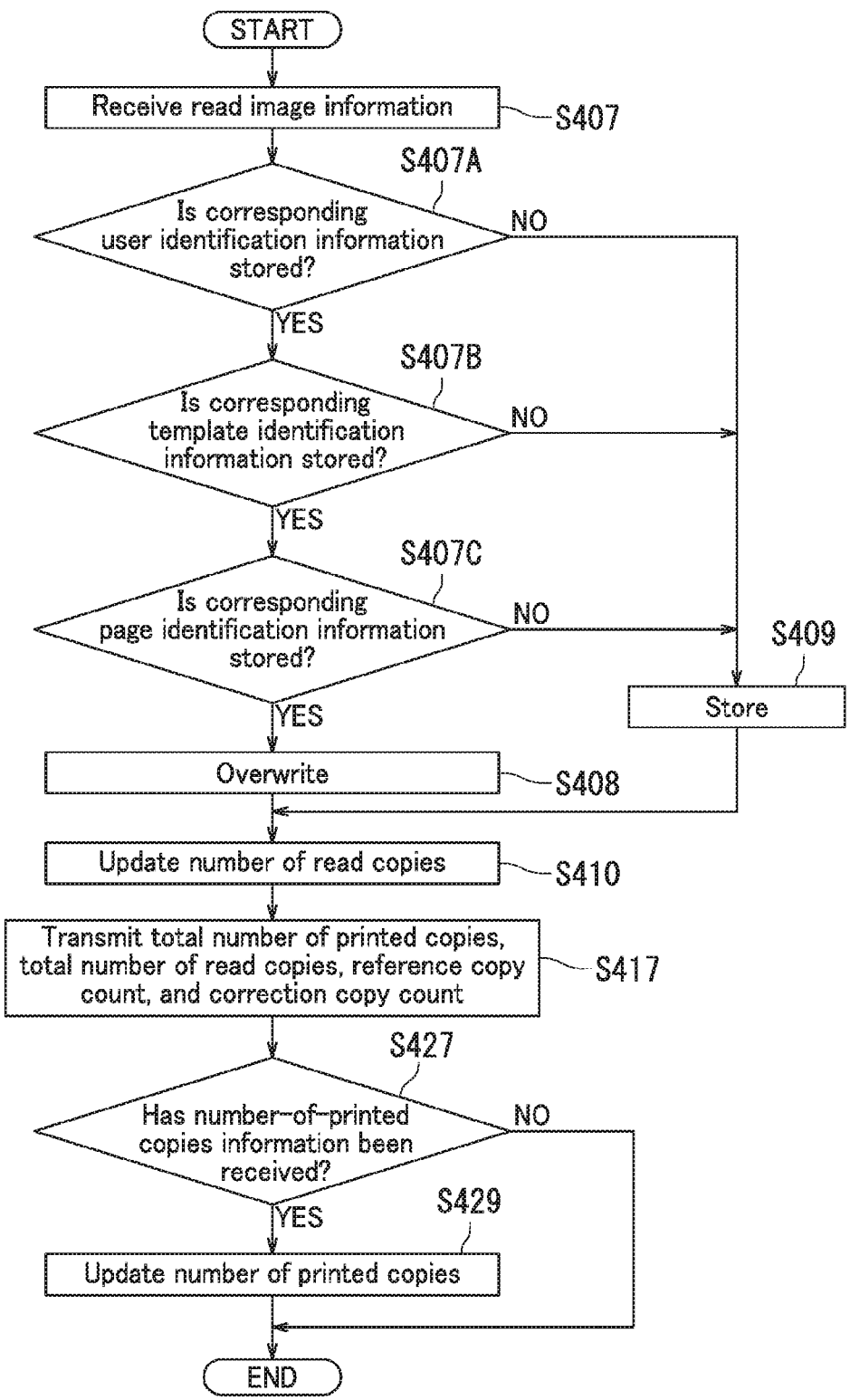
FIG. 8 is a flowchart showing a printing management process of the server apparatus of FIG. 1.

Next, a printing management process will be described with reference to FIGS. 4 and 8. The printing management process described here is performed by the server apparatus 200 when a student requests reading of the original document H. FIG. 8 is a flowchart showing the printing management process of the server apparatus 200 of FIG. 1.

In step S407, the second reception section 220 receives the read image information. Specifically, the second reception section 220 receives the read image information and the number-of-read-copies information associated with the user identification information, the template identification information, and the page identification information from the image forming apparatus 100, and notifies the counting section 240 of these items of information. Control proceeds to step S407A. Step S407 partially corresponds to step S307 of the printing management process of the image forming apparatus 100 which has been described above with reference to FIG. 7.

Next, in step S407A, the counting section 240 checks the received user identification information with the user identification information stored in the second storage section 260. As a result, the counting section 240 determines whether or not the corresponding user identification information is stored in the second storage section 260. When the corresponding user identification information is stored in the second storage section 260 (YES in step S407A), control proceeds to step S407B. Meanwhile, when the corresponding user identification information is not stored in the second storage section 260 (NO in step S407A), control proceeds to step S409.

When the condition for the above branch at step S407A is satisfied ("YES"), control proceeds to step S407B. In step S407B, the counting section 240 checks the received template identification information with the template identification information stored in the second storage section 260. As a result, the counting section 240 determines whether or not the corresponding template identification information is stored in the second storage section 260. When the corresponding template identification information is stored in the second storage section 260 (YES in step S407B), control proceeds to step S407C. Meanwhile, when the corresponding template identification information is not stored in the second storage section 260 (NO in step S407B), control proceeds to step S409.

When the condition for the above branch at step S407B is satisfied ("YES"), control proceeds to step S407C. In step S407C, the counting section 240 checks the received page identification information against the page identification information stored in the second storage section 260. As a result, the counting section 240 determines whether or not the corresponding page identification information is stored in the second storage section 260. When the corresponding page identification information is stored in the second storage section 260 (YES in step S407C), control proceeds to step S408. Meanwhile, when the corresponding page identification information is not stored in the second storage section 260 (NO in step S407C), control proceeds to step S409.

When the condition for the above branch at step S407C is satisfied ("YES"), control proceeds to step S408. In step S408, the original document image recording section 230 overwrites the read image information. Specifically, the original document image recording section 230 overwrites the read image information associated with the user identification information, the template identification information, and the page identification information, which has been detected in the second storage section 260, with the received read image information. Control proceeds to step S410.

When the condition for the above step S407A, S407B, or S407C is not satisfied ("NO"), control proceeds to step S409. In step S409, the original document image recording section 230 stores the read image information to the second storage section 260. Specifically, the corresponding read image information is not stored in the second storage section 260, and therefore, the original document image recording section 230 newly writes the read image information in association with the user identification information, the template identification information, and the page identification information to the second storage section 260. The original document image recording section 230 notifies the counting section 240 of the result of the writing. Control proceeds to step S410.

Next, in step S410, the counting section 240 adds the number of read copies indicated by the number-of-read-copies information received from the second reception section 220, to the total number of read copies NR. The counting section 240 overwrites the total number of read copies NR stored in the second storage section 260 with the resultant total number of read copies NR. As a result, the counting section 240 updates the number of read copies. Control proceeds to step S417.

Next, in step S417, a process similar to that of step S217 which has been described above with reference to FIG. 6 is performed. Control proceeds to step S427.

Next, in step S427, a process similar to that of step S227 which has been described above with reference to FIG. 6 is performed. In step S427, the second reception section 220 determines whether or not the second reception section 220 has received the number-of-printed-copies information. When the second reception section 220 has received the number-of-printed-copies information (YES in step S427), control proceeds to step S429. Meanwhile, when the second reception section 220 has not received the number-of-printed-copies information (NO in step S427), then the process ends.

Next, in step S429, a process similar to that of step S229 which has been described above with reference to FIG. 6 is performed. Thereafter, the process ends.

As described above with reference to FIGS. 1-8, according to this embodiment, the printing section 30 prints template paper F corresponding to the user identification information. When the acceptance section 20 accepts a print request or a read request, the first reception section 60 of the image forming apparatus 100 receives, from the server apparatus 200, the total number of printed copies NP and the total number of read copies NR which have been calculated for each user indicated by the user identification information. The determination section 70 determines whether or not the template paper F is to be printed, on the basis of the total number of printed copies NP and the total number of read copies NR. For example, the difference between the total number of printed copies NP and the total number of read copies NR corresponds to the number of remaining copies ΔN. Therefore, extra copies of the template paper F can be inhibited from being printed, depending on the remaining sheets of the template paper F possessed by each user.

In addition, according to this embodiment, the printing section 30 prints template paper F corresponding to the template identification information. The counting section 240 calculates the total number of printed copies NP and the total number of read copies NR for each template indicated by the template identification information. Therefore, extra copies of template paper F can be inhibited from being printed for each template of template paper F.

In addition, according to this embodiment, the second storage section 260 of the server apparatus 200 also stores the predetermined reference copy count NA in association with the user identification information and the template identification information. When the number of remaining copies ΔN obtained by subtracting the total number of read copies NR from the total number of printed copies NP is greater than or equal to the reference copy count NA, the determination section 70 determines that template paper F is not to be printed. Therefore, when the number of remaining copies of template paper F possessed by each user is greater than or equal to the predetermined reference copy count NA, extra copies of the template paper F can be inhibited from being printed. For example, by outputting a guidance message "XX copies of the template paper F are remaining, and it is not necessary to print extra copies," extra copies of the template paper F can be inhibited from being printed.

In addition, according to this embodiment, the counting section 240 calculates the average number of read copies NV for each user indicated by the user identification information and each template indicated by the template identification information. The counting section 240 writes the average number of read copies NV as the reference copy count NA to the second storage section 260 of the server apparatus 200. Therefore, the number of copies currently possessed by a student can be maintained at an appropriate value according to the average value of the numbers of read copies.

In addition, according to this embodiment, the original document image recording section 230 writes the read image information in association with the user identification information and the template identification information to the second storage section 260. As a result, a read image is stored to the second storage section 260. Therefore, a teacher or a student's parent can access the server apparatus 200 using a personal computer or the like, and visually inspect the acquired read image. This can improve the convenience of the user (a teacher and a student's parent).

In addition, according to this embodiment, the original document image recording section 230 writes the read image information in association with the page identification information to the second storage section 260. When the user identification information, the template identification information, and the page identification information all indicate the same user, template, and page, the original document image recording section 230 overwrites the image data of the original document H. Therefore, only the latest image data can be stored in the second storage section 260 of the server apparatus 200. The total number of read copies NR can also be accurately obtained.

Figure 9:
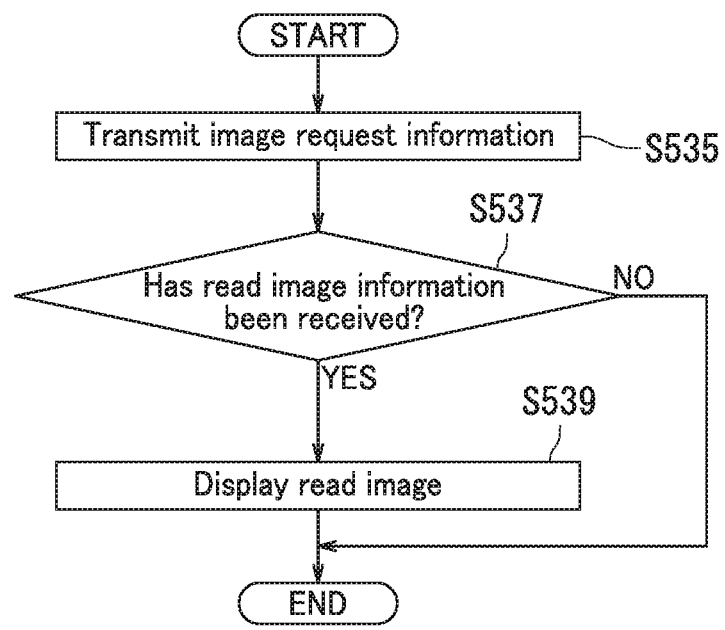
FIG. 9 is a flowchart showing an image browsing process of a tablet PC of FIG. 1.

Next, an image browsing process will be described with reference to FIGS. 4 and 9. The image browsing process described herein is performed by the tablet PC 300 when a student requests browsing of an image on the note paper F1. FIG. 9 is a flowchart showing the image browsing process of the tablet PC 300.

In step S535, the third transmission section 320 transmits the image request information in association with the user identification information and the template identification information to the server apparatus 200 according to a student's or teacher's operation. Control proceeds to step S537.

Next, in step S537, the third reception section 330 determines whether or not the read image information has been received. Specifically, the third reception section 330 receives the read image information which is transmitted from the server apparatus 200 according to the image request information. The third reception section 330 stores the read image information to the third storage section 350. When the third reception section 330 thus receives the read image information (YES in step S537), control proceeds to step S539. Meanwhile, when the third reception section 330 does not receive the read image information (NO in step S537), then the process ends.

Next, in step S539, the display section 340 displays a read image corresponding to the read image information on the touchscreen. Thereafter, the process ends.

Figure 10:
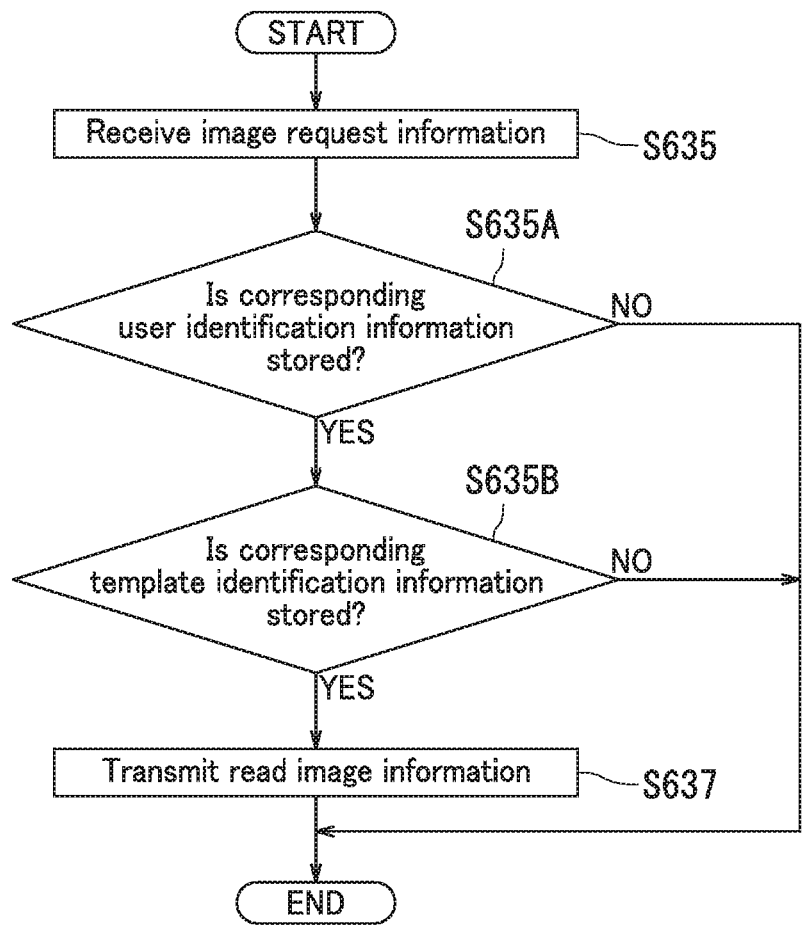
FIG. 10 is a flowchart showing an image browsing process of the server apparatus of FIG. 1.

Next, an image browsing process will be described with reference to FIGS. 4 and 10. The image browsing process described here is performed by the server apparatus 200 when a student requests browsing of an image on the note paper F1. FIG. 10 is a flowchart showing the image browsing process of the server apparatus 200.

In step S635, the second reception section 220 receives the image request information associated with the user identification information and the template identification information from the tablet PC 300. Control proceeds to step S635A. Step S635 partially corresponds to step S535 of the image browsing process of the tablet PC 300 which has been described above with reference to FIG. 9.

Next, in step S635A, the counting section 240 checks the received user identification information with the user identification information stored in the second storage section 260. As a result, the counting section 240 determines whether or not the corresponding user identification information is stored in the second storage section 260. When the corresponding user identification information is stored in the second storage section 260 (YES in step S635A), control proceeds to step S635B. Meanwhile, when the corresponding user identification information is not stored in the second storage section 260 (NO in step S635A), then the process ends.

Next, in step S635B, the counting section 240 checks the received template identification information with the template identification information stored in the second storage section 260. As a result, the counting section 240 determines whether or not the corresponding template identification information is stored in the second storage section 260. When the corresponding template identification information is stored in the second storage section 260 (YES in step S635B), control proceeds to step S637. Meanwhile, when the corresponding template identification information is not stored in the second storage section 260 (NO in step S635B), the process ends.

Next, in step S637, the counting section 240 reads the read image information associated with the user identification information and the template identification information from the second storage section 260. The second transmission section 250 transmits the read image information which has been read out, to the tablet PC 300. Thereafter, the process ends.

As described above with reference to FIGS. 1-10, the printing management system 1 further includes the tablet PC 300 communicably coupled to the server apparatus 200. The tablet PC 300 receives the read image information which is transmitted from the server apparatus 200 according to the image request information. Therefore, the user can easily check a content written on template paper F using the tablet PC 300.

In the foregoing, embodiments of the present disclosure have been described with reference to the drawings (FIGS. 1-10). Note that the present disclosure is not limited to the above embodiments, and may be applied to various alternative embodiments without departing the spirit and scope of the present disclosure (e.g., (1)-(12) described below). A plurality of components disclosed in the above embodiments may be combined as appropriate to form various disclosures. For example, several components of all the components described in the embodiments may be removed. The drawings mainly illustrate the components schematically for ease of understanding. The thicknesses, lengths, number, etc., of the components shown are not to scale for the sake of convenience of illustration. The shapes, etc., of the components illustrated in the above embodiments are only for illustrative purposes and are not particularly limited, and may be changed and modified without substantially departing the configuration of the present disclosure.

(1) Although a plurality of template images including the template image GF1 described above with reference to FIGS. 3A, 3B, and 4 are previously stored in the first storage section 80, the present disclosure is not limited to this. The plurality of template images may be stored in, for example, the second storage section 260 of the server apparatus 200.

(2) Although the correction copy count NS of the note paper F1 described above with reference to FIG. 4 is set so that a margin of a predetermined number of copies is added to the number of remaining copies ΔN of the note paper F1 currently possessed by a student, the present disclosure is not limited to this. For example, the correction copy count NS may be set so that a student possesses copies required for two classes. Alternatively, in an embodiment in which there are a predetermined number of classes for a predetermined period of time, the predetermined number of classes may be previously stored, and the correction copy count NS may be set according to the number of classes which have not yet been finished. For example, if the correction copy count NS is set so that a student possesses copies required for two classes as described above, then when there is only one remaining class which has not yet been finished, the correction copy count NS may be changed to "0."

(3) Although the user identification information, the template identification information, the page identification information, the read image information, the total number of printed copies NP, the total number of read copies NR, the correction copy count NS, the average number of read copies NV, the number of reading times NE, and the reference copy count NA which have been described above with reference to FIGS. 1-4 are stored in the second storage section 260, the present disclosure is not limited to this. For example, in an embodiment in which the printing management system 1 includes only one image forming apparatus 100, the image forming apparatus 100 may have the functions of the counting section 240 and the second storage section 260 included in the server apparatus 200. As a result, the server apparatus 200 can be removed. In such an embodiment, the tablet PC 300 is communicably coupled to the image forming apparatus 100.

(4) Although a student can modify the corrected number of remaining copies ΔNC ("the total number of printed copies NP"–"the total number of read copies NR"+"the correction copy count NS") of the note paper F1 currently possessed by the student on the basis of the correction copy count NS during issuance of a print request or a read request, as described above with reference to FIGS. 4-10, the present disclosure is not limited to this. The time when a student or a teacher can modify the value of the number of remaining copies ΔN is not limited to during issuance of a print request or a read. request. For example, when the number of remaining copies ΔN is different from the number of remaining copies ΔNB of the note paper F1 actually currently possessed, a student or a teacher can modify the value of the number of remaining copies ΔN to be equal to the value of the actual number of remaining copies ΔNB by operating the touchscreen of the image forming apparatus 100 or the touchscreen of the tablet PC 300. Therefore, when a student breaks, stains, or loses the note paper F1, the occurrence of an error in the value of the number of remaining copies ΔN managed by the server apparatus 200 can be inhibited.

(5) Although the determination section 70 of the image forming apparatus 100 described above with reference to FIGS. 4-8 receives the total number of printed copies NP and the total number of read copies NR from the server apparatus 200, and subtracts the total number of read copies NR from the total number of printed copies NP to obtain the number of remaining copies ΔN of the note paper F1 currently possessed, the present disclosure is not limited to this. For example, the number of remaining copies ΔN of the note paper F1 currently possessed (the total number of printed copies NP−the total number of read copies NR) may be stored in the second storage section 260 of the server apparatus 200 or the first storage section 80 of the image forming apparatus 100. In this case, the determination section 70 can obtain the number of remaining copies ΔN by reading the stored number of remaining copies ΔN from the second storage section 260 or the first storage section 80.

(6) Although the determination section 70 of the image forming apparatus 100 described above with reference to FIGS. 4 and 5, when determining that it is not necessary to print the note paper F1, displays a message on the touchscreen and then prohibits printing, the present disclosure is not limited to this. For example, the determination section 70 may display a message on the touchscreen, and then cause a specified number of copies of the note paper F1 to be printed. Alternatively, the determination section 70 may display a message on the touchscreen, and then cause a specified number of copies of the note paper F1 to he printed, and notify a teacher of the number of printed copies using an electronic mail. Alternatively, the determination section 70 may display a message on the touchscreen, and then prohibit a student from printing, and allow a teacher to print and hand the note paper F1 to a student.

(7) Although the counting section 240 of the server apparatus 200 described above with reference to FIGS. 4 and 7 checks whether or not the read image information about the same page is stored in the second storage section 260, on the basis of the user identification information, the template identification information, and the page identification information, the present disclosure is not limited to this. For example, by performing image processing on a read image indicated by the read image information, it can be determined whether or not the read image information partially matches that which is stored in the second storage section 260. Thus, it can be checked whether the read image information about the same page is stored in the second storage section 260.

(8) Although the determination section 70 of the image forming apparatus 100 described above with reference to FIGS. 4 and 7 displays, on the touchscreen, a message indicating that the number of remaining copies ΔN of the note paper F1 currently possessed is not great enough, and a student checks whether or not printing is required, the present disclosure is not limited to this. For example, the determination section 70 may display, on the touchscreen, a message indicating that the number of remaining copies ΔN of the note paper F1 currently possessed is not great enough, and at the same time, control the printing section 30 to print one or more copies the number of which is equal to the difference (the corrected number of remaining copies ΔNC) between "the total number of printed copies NP−the total number of read copies NR+the correction copy count NS" and "the reference copy count NA." As a result, the convenience of the user's printing operation can be improved.

(9) Although the determination section 70 of the image forming apparatus 100 described above with reference to FIGS. 4 and 7 displays, on the touchscreen of the image forming apparatus 100, a message indicating that the number of remaining copies ΔN of the note paper F1 currently possessed is not great enough, the present disclosure is not limited to this. For example, the determination section 70 may transmit an electronic mail to a student's or a teacher's tablet PC 300 so that such a message is displayed on the touchscreen of the tablet PC 300. The determination section 70 may transmit such a message to an electronic mail address of a student's or a teacher's tablet PC 300 which is previously registered.

(10) Although when the acceptance section 20 of the image forming apparatus 100 described above with reference to FIG. 7 has not accepted the instruction to modify the number of remaining copies ΔN of the note paper F1 (NO in step S330), the printing management process ends, the present disclosure is not limited to this. For example, when one or more copies corresponding to a shortfall have not been printed and the number of remaining copies ΔN has not been modified by a student before the start of the next class, a message indicating that the number of remaining copies ΔN of the note paper F1 is not great enough may be transmitted to an electronic mail address of a student's or a teacher's tablet PC 300 which is previously registered. Alternatively, when one or more copies corresponding to a shortfall have not been printed and the number of remaining copies ΔN has not been modified by a student before the start of the next class, a list of students for which the number of remaining copies ΔN is not great enough may be displayed on the touchscreen of a predetermined image forming apparatus 100, or an LED provided in the touchscreen of the image forming apparatus 100 may be caused to blink.

(11) Although the printing management system of FIG. 1 includes a plurality of image forming apparatuses 100, the present disclosure is not limited to this. In an embodiment, the printing management system 1 may include only one image forming apparatus 100.

(12) Although a plurality of template images including the template image GF1 are previously stored in the first storage section 80 of the image forming apparatus 100 as described above with reference to FIGS. 3A, 3B, and 4, the present disclosure is not limited to this. For example, in addition to the plurality of template images including the template image GF1, another template image(s) may be stored in the first storage section 80 as required.

The invention claimed is:

1. A printing management system comprising:
an image forming apparatus; and
a server apparatus communicably coupled to the image forming apparatus, wherein
the image forming apparatus includes
an acceptance section configured to accept user identification information for identifying a user, a print request for requesting printing of template paper on which a printing image containing a predetermined template image and a user identification image indicating the user identification information is formed, and a read request for requesting reading of an image on an original document which is the template paper which has been filled in,
a printing section configured to print he template paper upon the print request being accepted,
a reading section configured to read the image on the original document to acquire the user identification information upon the read request being accepted,
a first transmission section configured to transmit number-of-printed-copies information indicating the number of copies printed by the printing section, in association with the user identification information, to the server apparatus, and transmit number-of-read-copies information indicating the number of copies read by the reading section, in association with the user identification information, to the server apparatus, a first reception section configured to receive, from the server apparatus, the total number of printed copies obtained by adding up the numbers of printed copies for each user indicated by the user identification information, and the total number of read copies obtained by adding up the numbers of read copies for each user indicated by the user identification information, and a determination section configured to, when the acceptance section accepts the print request or the read request, determine whether or not the template paper is to be printed, on the basis of the total number of printed copies and the total number of read copies received by the first reception section, and the server apparatus includes a second reception section configured to receive, from the image forming apparatus, the number-of-printed-copies information, the number-of-read-copies information, and the user identification information, a storage section configured to store the total number of printed copies and the total number of read copies in association with the user identification information, a counting section configured to obtain the total number of printed copies on the basis of the number of printed copies and the user identification information, obtain the total number of read copies on the basis of the number of read copies and the user identification information, and write the total number of printed copies and the total number of read copies to the storage section, and a second transmission section configured to transmit the total number of printed copies and the total number of read copies to the image forming apparatus.

2. The printing management system according to claim 1, wherein the acceptance section, when accepting the print request, further accepts template identification information for identifying the template image, the printing section further adds a template identification image indicating the template identification information to form the printing image, the first transmission section transmits the number-of-printed-copies information in association with the template identification information as well as the user identification information to the server apparatus, the second reception section receives the number-of-printed-copies information and the template identification information, and the counting section obtains the total number of printed copies and the total number of read copies for each template indicated by the template identification information.

3. The printing management system according to claim 2, wherein the storage section further stores a predetermined reference copy count in association with the user identification information and the template identification information, the second transmission section transmits reference copy count information indicating the reference copy count to the image forming apparatus, the first reception section receives the reference copy count information from the server apparatus, and the determination section determines that the template paper is not to be printed when the number of remaining copies obtained by subtracting the total number of read copies from the total number of printed copies is greater than or equal to the reference copy count.

4. The printing management system according to claim 3, wherein the counting section obtains the number of times the reading section has read the image on the original document for each user indicated by the user identification information and each template indicated by the template identification information, obtains the average number of read copies by dividing the total number of read copies by the number of times the reading section has read, and writes, to the storage section, the average number of read copies as the reference copy count in association with the user identification information and the template identification information.

5. The printing management system according to claim 2, wherein the first transmission section transmits, to the server apparatus, read image information indicating an image read by the reading section in association with the user identification information and the template identification information, the second reception section receives the read image information, the user identification information, and the template identification information from the image forming apparatus, and the server apparatus further includes an original document image recording section configured to write the read image information in association with the user identification information and the template identification information to the storage section.

6. The printing management system according to claim 5, wherein the printing section further adds a page identification image indicating page identification information for identifying a page number of the template paper to form the printing image, the reading section acquires the page identification information from the page identification image contained in the read image, the first transmission section transmits, to the second reception section, the read image information in association with the page identification information as well as the user identification information and the template identification information, and the original document image recording section writes, to the storage section, the read image information in association with the page identification information as well as the user identification information and the template identification information.

7. The printing management system according to claim 5, further comprising:

a terminal apparatus communicably coupled to the server apparatus, wherein the terminal apparatus includes a third transmission section configured to transmit the user identification information, the template identification information, and image request information to the server apparatus, a third reception section configured to receive the read image information transmitted from the server apparatus according to the image request information, and a display section configured to display the received, read image, the image request information indicates a request for the read image information corresponding to the user identification information and the template identification information, the second reception section receives the user identification information, the template identification information, and the image request information, and the second transmission section reads, from the storage section, the read image information corresponding to the user identification information and the template identification information, and transmits the read image information read out to the terminal apparatus.

8. The printing management system according to claim 3, wherein the storage section further stores a predetermined correction copy count in association with the user identification information and the template identification information, the second transmission section transmits correction copy count information indicating the correction copy count to the image forming apparatus, the first reception section receives the correction copy count information from the server apparatus, and the determination section, when a corrected value of the number of remaining copies obtained by adding the correction copy count to the number of remaining copies is greater than or equal to the reference copy count, determines that the template paper is not to be printed.

9. The printing management system according to claim 8, wherein the determination section, when the corrected value of the number of remaining copies is smaller than the reference copy count, determines that one or more copies of the template paper, the number of which is equal to the number of copies obtained by subtracting the correction copy count from the reference copy count, are to be printed.

10. An image forming apparatus comprising:

an acceptance section configured to accept user identification information for identifying a user, a print request for requesting printing of template paper on which a printing image containing a predetermined. template image and a user identification image indicating the user identification information is formed, and a read request for requesting reading of an image on an original document which is the template paper which has been filled in;

a printing section configured to print the template paper upon the print request being accepted;

a reading section configured to read the image on the original document to acquire the user identification information upon the read request being accepted;

a first transmission section configured to transmit number-of-printed-copies information indicating the number of copies printed by the printing section, in association with the user identification information, to a server apparatus, and transmit number-of-read-copies information indicating the number of copies read by the reading section, in association with the user identification information, to the server apparatus;

a first reception section configured to receive, from the server apparatus, the total number of printed copies obtained, by adding up the numbers of printed copies for each user indicated by the user identification information, and the total number of read copies obtained by adding up the numbers of read copies for each user indicated by the user identification information; and a determination section configured to, when the acceptance section accepts the print request or the read request, determine whether or not the template paper is to be printed, on the basis of the total number of printed copies and the total number of read copies received by the first reception section.

* * * * *